Jan. 15, 1963   R. BLASCHEK ET AL   3,073,236
COOKING DEVICE
Original Filed April 23, 1958
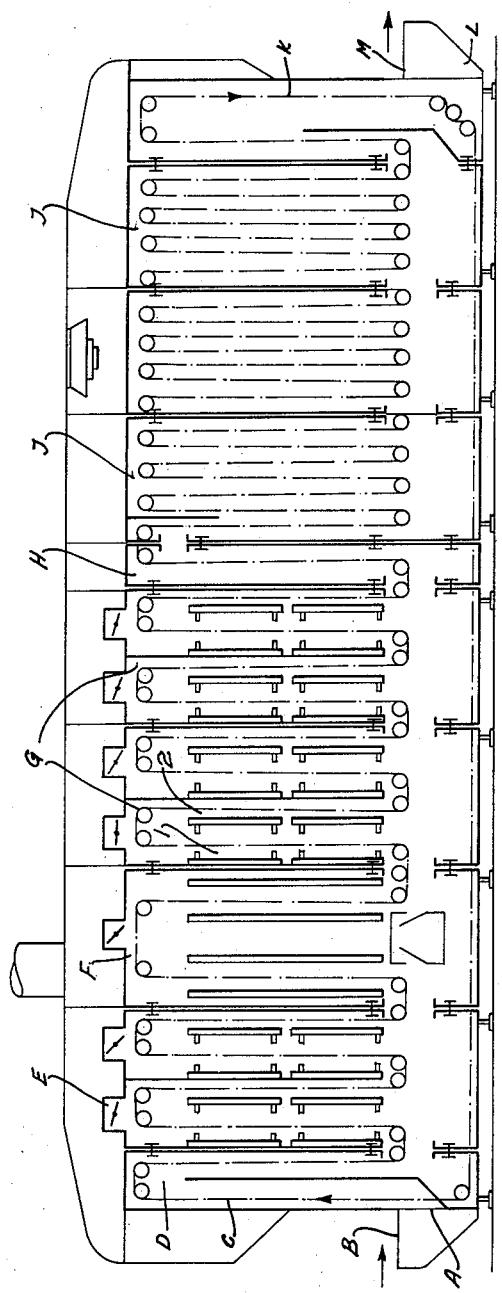
INVENTORS
Rudolf Blaschek
Max Schüffler
BY Michael S. Striker
Attorney

United States Patent Office

3,073,236
Patented Jan. 15, 1963

3,073,236
COOKING DEVICE
Rudolf Blaschek, Erfurt, and Max Schüffler, Kranichfeld, Germany, assignors to VEB Erfurter Malzerei u. Speicherbau, Erfurt, Thuringia, Sorbenweg, Germany
Original application Apr. 23, 1958, Ser. No. 730,420. Divided and this application Oct. 8, 1959, Ser. No. 845,106
2 Claims. (Cl. 99—420)

The present invention relates to a smoking device, and more particularly, it relates to a device for the smoking of fish by the combined electrostatic infra-red method.

Our present application is a division of our copending patent application Serial No. 730,420, filed April 23, 1958, and entitled "Smoking Method and Device."

It is well known that it is not sufficient to smoke fish or the like but, in addition thereto, in order to make the fish fit for human consumption the same has to be cooked, i.e. the same has to be exposed to a sufficiently high temperature for a sufficiently long period of time so as to make the smoked fish fit for immediate human consumption. Furthermore, it is necessary to dry the skin of the fish prior to the smoking of the same in order to give to the skin the required degree of firmness and strength. Finally, after the heattreatment of the fish which herein is generally referred to as "cooking," the same has to be cooled. More or less automatic devices are known in which the surface drying, smoking and heating, i.e. cooking, and cooling of the fish can be successively carried out in a continuous manner.

However, the results obtained with these devices are not completely satisfactory particularly as far as the heating or cooking of the fish is concerned.

It has for instance been observed in experimental installations that during the heating of the fish so as to cook the same, liquid accumulates in the inner portion of the fish which at correspondingly high temperatures results in an overcooking of the interior portions of the fish comparable to boiling of the same in water.

It is therefore an object of the present invention to overcome the aforementioned and other disadvantages of existing fish smoking and cooking devices.

It is another object of the present invention to provide a method and device for the smoking and cooking of fish whereby the same will be evenly cooked throughout.

It is yet another object of the present invention to provide a method and device for the cooking of animalic products of relatively high water content whereby said products will be evenly cooked, and drying out of the outer portions of the same and an increase in the moisture content of the inner portions of the same will be prevented.

It is still a further object of the present invention to provide a method and device for the smoking and cooking of fish which will result in an economical manner in an evenly cooked product of high quality.

Other objects and advantages of the present invention will become apparent from a further reading of the description and the appended claims.

With the above and other objects in view, the present invention mainly comprised in a method of cooking an animalic product of relatively high water content such as smoked fish and the like, the improvements which consists in subjecting the animalic product during successive spaced first time periods to a temperature above the minimum cooking temperature thereof, the length of each of the first time periods being such that the outer portion only of the animalic product is heated, and subjecting the animalic product during second time periods alternating with the first time periods to a temperature below the minimum cooking temperature thereof, the inner portion of the animalic product being heated during the first and second time periods by the flow of heat thereto from the outer portion thereof, whereby drying out of the outer portion of the animalic product and increase in the moisture content of the inner portion thereof during the cooking of the same is prevented.

The present invention also contemplates a device for cooking an animalic product of relatively high water content such as fish and the like, comprising, in combination, a plurality of alternatingly arranged successive first and second channel means, means for heating the interior of each of the first channel means to an elevated temperature above the minimum cooking temperature of the animalic product, and transport means for transporting the animalic product through the plurality of alternatingly arranged first and second channel means, whereby the animalic product while passing through the first channel means will be heated at its surface portion, and the inner portion of the animalic product will be heated while the product passes through the first and second channel means, due to flow of heat thereto from the thus heated outer portion of the product.

The present invention will now be described particularly with respect to a preferred mode of carrying out the same namely by heating or cooking the fish by means of infra-red radiation, preferably by passing the fish or the like through channels which are heated by infra-red radiation.

Generally, it has been found that when a moisture containing body is exposed to heating of its surface, the moisture of the surface portion will migrate towards the colder portions of the body, i.e. towards the inner portion of the same. In the case of a fish being irradiated from all sides, the moisture of the surface portions of the fish will at least partly migrate towards the interior portions of the fish. When the irradiation heating is carried out continuously until the entire fish has been cooked so as to be fit for human consumption, then the moisture of the outer portions of the fish will migrate due to the high temperature gradient, from the surface of the fish towards the center of the same and thereby in the interior portion of the fish an excess concentration of moisture will occur while simultaneously an excessive drying out of the surface portions of the fish takes place. Consequently, the required or at least desired even juiciness of the smoked fish meat cannot be achieved.

Surprisingly, it has been found that the above difficulties can be advantageously overcome according to the present invention by intermittently irradiating the fish in the cooking area. By such intermittent irradiation the following will occur in the interior of the fish:

Due to the intensive infra-red irradiation of the surface of the fish, the temperature of the surface portion of the fish or the like is raised and, during subsequent interruption of the irradiation, an equalization between the thus-heated fish surface portion and the not yet heated interior of the fish takes place due to the flow of heat from the surface portions of the fish towards the interior of the same. Thereafter, the surface portion of the fish is again exposed to infra-red heat irradiation so as to be heated to a higher surface temperature which upon subsequent interruption of the irradiation is again equalized with the lower temperature of the interior of the fish. Thus, the temperature level of the entire fish is raised within each cycle consisting of an irradiation period and an equalization period. Thereby, a steep temperature gradient between the outer portion of the fish and the inner portion of the same is avoided and consequently also migration of moisture from the outer portion of the fish towards the interior. Consequently, the meat of the fish upon completion of the irradiation heating will be of evenly juicy consistency without excessive accumulation of moisture in the interior on the one hand and excessive drying or dehydration in the outer portion on the other hand. Thereby, not only the quality but also the storability of the thus-cooked smoked fish is greatly improved. As stated above, ready to eat, i.e. cooked, smoked fish or the like of high quality must be juicy, it must not be dry in appearance or taste.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which the FIGURE is a schematic illustration of the device of the present invention.

Referring now to the drawing, a plurality of alternatingly arranged channels 1 and 2 are shown. Channels 1 are heated by infra-red radiation, while channels 2 alternating with channels 1, are not so heated. Preferably, the fish attached to strips or the like are passed upwardly through the heated channels and downwardly through the non-irradiated channels 2. Thereby it is achieved that the convection heat accumulates in the upper portions of the individual channels and it is prevented that heat passes in channels 2 from the fish to its surroundings since during downward movement of the fish through non-irradiated channels 2, the surface portion of the fish will give up heat to the interior portion thereof, while simultaneously the temperature in the channel will drop in downward direction. Preferably, the temperature in channels 2 is maintained at a level not lower than the surface temperature of the fish entering the respective channels 2.

In this manner, apart from the biological advantages of the process of the present invention resulting in a higher quality of the finished product, also great savings on radiation energy are achieved.

The following example is illustrative of the process of the present invention, the invention however not being limited to the specific details of the example.

*Example 1*

The attached drawing is showing an example of an embodiment in the most usual form according to the present invention. The animal products, for inst. fish or the like, fastened on spikes are delivered at the Delivery A by an operater to the Feeding Chain B. This feeding chain is synchronically connected with the Main Conveying Chain C. At the crossing point of the chains B and C the spikes are automatically taken over from the feeding chain B by the chain C and automatically transported in the direction of the arrow through the whole device. The conveying chain speed is variable and may be adapted to the different animal products, for inst. fish or the like. During the running of the chain through the device the products are passing the different zones of treatment described in the following:

Entry Zone D—Preliminnary Drying Zone E—whereat at once may be remarked that by reasons of rational production the same construction is used as for the zone of thoroughly cooking. In this zone E the preliminary drying is achieved, with fish for inst. the strengthening of the skin and bones respectively. Afterwards the product passes into the Smoke Zone F. In this zone the product is struck according to the electrostatic principle with smoke, which is fed from a separate full-automatic smoke generator placed beside the device. The product thus struck with smoke passes now into the Zone of Thorough Cooking G.

In the present example it consists of four channels 1 each with infra-red radiation, in which a temperature above the temperature of thorough cooking is obtained, and of four channels 2, in which the temperature of the surfaces settles with the temperatures in the interior of the product. Subsequently the product passes a Neutral Zone H before entering the following Cooling Zone J.

In this zone the product is cooled down to the core by circulating fresh air. At the end of the cooling zone the product passes a UV-Radiating Zone K serving the purpose to make the surface free from germs. This zone makes it possible to carry out cooling in the cooling zone with ambient fresh air and installation of an air bacterium filter can be avoided. At the Outlet L of the device the spikes with the treated and cooled product are transported out of the device again at the crossing point of the Main Conveying Chain C with the Carrying-off Chain M. Here the product can be packed at once into cases or corresponding containers and made ready for dispatch.

Summarizing this example, it is to be remarked that the device in question is not defined for one purpose only and arranged for determined speeds, temperatures and weights of the product to be treated. This is already mentioned by the above described wide range of adjustability of the chain conveyor speed. In conjunction therewith the temperature of the heating sections may be adjusted, preferably by adjustable infra-red heaters, which are mounted, of course, in each device. The technological variations are manyfold. The principle of the invention does not confine the weight and size of the product to be treated.

It will be understood that each of the elements described above, or two or more together, may also find a useful application in other types of heating and cooking devices differing from the types described above.

While the invention has been illustrated and described as embodied in a fish smoking device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for cooking an animal product comprising, in combination, a series of first channel means and a series of second channel means, said channel means being arranged sequentially with first channel means alternating with second channel means and said channel means having opposite end portions communicating with end portions of adjacent channel means; heating means for heating the interior of each first channel means whereby each first channel means forms a heated channel means while the inbetween second channel means are being maintained at a temperature below the temperature of said heated first channel means; and transport means for transporting an animal product to be cooked sequentially through said series of sequentially arranged alternating first and second channel means, so that in each of said heated first channel means the outer portion of said animal product will be heated to a tempertature higher than the temperature in said second channel means while the inner portion of said animal product will be heated during passage of the same through all of said alternating first and second channel means by flow of heat from the outer portion of said animal product to a desired cooking temperature without overcooking the outer portion of said animal product.

2. In a fish-smoking and cooking device, in combination, a series of first upright channel means and a series of second upright channel means, said channel means being arranged sequentially with first channel means parallel to and alternating with second channel means and said channel means having opposite end portions communicating with end portions of adjacent channel means; heating for heating the interior of each first channel means whereby each first channel means forms a heated channel means while the inbetween second channel means are being maintained at a temperature below the temperature of said heated first channel means; and transport means for transporting smoked fish to be cooked sequentially through said series of sequentially arranged alternating first and second channel means, so that in each of said heated first channel means said smoked fish will move in upward direction and the outer portion thereof will be heated to a temperature at least as high as the temperature in said second channel means while the inner portion of said smoked fish will be heated during downward passage of said smoked fish through all of said alternating first and second channel means by flow of heat from the outer portion of said smoked fish to a desired cooking temperature without overcooking the outer portion of said smoked fish.

References Cited in the file of this patent

UNITED STATES PATENTS

| | | |
|---|---|---|
| 1,483,668 | Little | Feb. 12, 1924 |
| 2,138,813 | Bemis | Dec. 6, 1938 |
| 2,655,096 | Ebin | Oct. 13, 1953 |
| 2,844,478 | Hanley et al. | July 22, 1958 |

FOREIGN PATENTS

| | | |
|---|---|---|
| 327,389 | Great Britain | Apr. 1, 1930 |